(12) United States Patent
Till

(10) Patent No.: US 6,564,172 B1
(45) Date of Patent: May 13, 2003

(54) METHOD AND APPARATUS FOR ONBOARD LOCOMOTIVE FUEL USAGE INDICATOR

(75) Inventor: Ronald Herman Till, Fairview, PA (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 09/695,192

(22) Filed: Oct. 24, 2000

Related U.S. Application Data
(60) Provisional application No. 60/162,302, filed on Oct. 28, 1999.

(51) Int. Cl.$^7$ .............................................. G06F 15/00
(52) U.S. Cl. ........................ 702/182; 702/145; 702/189; 702/176; 700/281; 700/282; 701/29; 701/30; 701/69; 701/100; 123/204; 123/206
(58) Field of Search .................................. 702/182, 127, 702/81, 141, 142, 145, 147, 148, 149, 176, 189, 96, 98, 100, 104, 105, FOR 103, 106, 109, 111, 113, 115, 123, 129, 135, 138, 151, 155–157; 700/9, 17, 19, 20, 22, 27, 52, 63, 75, 76, 83, 275, 281–282, 286, 291; 701/29, 30, 51, 53, 54, 61, 69, 93, 100, 101, 102–104, 110, 112; 123/200–207, 210, 212–213, 216–220, 223, 229–230

(56) References Cited

U.S. PATENT DOCUMENTS 4,344,364 A * 8/1982 Nickles et al. ................ 105/62
4,840,056 A * 6/1989 Fernandez et al. ............... 73/1

* cited by examiner

Primary Examiner—Marc S. Hoff
Assistant Examiner—Elias Desta
(74) Attorney, Agent, or Firm—Carl A. Rowold; John L. DeAngelis, Jr.; Beusse Brownlee Bowdoin & Wolter, P.A.

(57) ABSTRACT

A method for determining the ideal fuel usage value of a locomotive or other off-highway vehicle is disclosed. The time spent in each of a plurality of operating modes is determined and applied to an algorithm for calculating the ideal fuel usage associated with that operating mode. The individual values calculated for each operating mode are summed in accord with the operating modes experienced during a given train run. The sum value represents the ideal fuel usage quantity for the train run.

12 Claims, 2 Drawing Sheets

METHOD AND APPARATUS FOR ONBOARD LOCOMOTIVE FUEL USAGE INDICATOR

This application claims the benefit of U.S. Provisional Application 60/162,302 filed on Oct. 28, 1999.

BACKGROUND OF THE INVENTION

This invention relates generally to locomotive fuel usage, and more specifically, to a method and apparatus for evaluating locomotive fuel efficiency and usage as determined by the locomotive operator's handling of the train during a given train run.

Large self-propelled traction vehicles, such as locomotives, commonly use a diesel engine to drive an electrical transmission system comprising a generator for supplying electric current to a plurality of direct current traction motors, whose rotors are driving coupled, through speed-reducing gearing, to the respective axle-wheel sets of the vehicle. The generator typically comprises a 3-phase traction alternator whose rotor is mechanically coupled to the output shaft of the engine, typically a 16-cylinder turbo-charged diesel engine. When excitation current is supplied to field windings of the rotating rotor, alternating voltages are generated in the 3-phase stator windings. The output voltage is rectified and applied to the armature windings of the traction motors. The diesel engine may also be driving coupled to an auxiliary alternator for supplying alternating current at a constant frequency to the various auxiliary systems on the locomotive or on the cars pulled by the locomotive.

During the "motoring" or propulsion mode of operation, a locomotive diesel engine delivers constant power from the traction alternator to the traction motors, depending on the throttle setting and ambient conditions, regardless of the locomotive speed. For maximum performance, the electrical power output of the traction alternator must be suitably controlled so that the locomotive utilizes full engine power. For proper train handling, intermediate power output levels are provided to permit graduation from minimum to full output. But the traction alternator load on the engine must not exceed the level of power the engine is designed to develop for a given speed. Overloads can cause premature wear, engine stalling or "bogging," or other undesirable effects. Historically, locomotive control systems have been designed so that the operator can select the desired level of traction power, in discrete steps between zero and maximum, so that the traction and auxiliary alternator, driven by the engine, can supply the power demanded by the traction load and the auxiliary loads, respectively.

In the prior art locomotives, when the throttle is advanced from one position to the next (commonly referred to as notches) the diesel engine speed and/or the load (or excitation) applied to the traction motors are simultaneously increased to the speed and horsepower point established for the new notch position. Some notch position changes may involve only a speed change, others only a horsepower change and still others a change in both the engine speed and delivered horsepower. The engine acceleration to the new speed point is controlled by the electronic fuel injection controller that adjusts the quantity of pressurized diesel fuel (i.e., fuel oil) injected into each of the engine cylinders so that the actual speed (in rpm) of the crankshaft corresponds to the desired speed. If the new notch position also commands a new horsepower value, the locomotive control system applies more excitation to the main alternator, which in turn supplies more current to the traction motors, increasing the motor horsepower.

The engine electronic fuel injection controller controls the engine speed in response to speed changes requested by the locomotive control system by way of a notch position change made by the locomotive operator. Generally, the fuel injection controller does not receive any signals from the throttle when it is changed from one notch position to another and therefore does not know when a notch change has occurred. Instead, the speed governor knows only the speed demand as requested by the locomotive control system. In fact, there may be multiple notch settings that vary the horsepower delivered by the traction motors without changing the engine speed.

For each of its eight different notch settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,500) are realized. The engine power at each notch equals the power demanded by the electric propulsion system, which is supplied by the engine-driven traction alternator, plus the power consumed by the electrically driven auxiliary equipment.

The locomotive fuel system includes a tank, a low pressure subsystem, and a high pressure subsystem. A typical diesel locomotive tank has a capacity of 5,000 gallons. A low pressure pump provides approximately seven gallons per minute (at 40 pounds per square inch (psi)) from the tank to a fuel header which supplies fuel to the high pressure pumps. Each cylinder has its own high pressure pump. In turn, the high pressure pump injects the fuel into a fuel injector at each diesel engine cylinder at a pressure of between 18,000 and 20,000 psi. At idle, approximately only 10% of the fuel drawn for the fuel tank by the low pressure pump is used for combustion. At notch 8, the percentage rises to approximately 60% to 70%. A pressure regulator interposed between the low pressure pump and high pressure pump bleeds off the unburned excess fuel not used for engine combustion and returns it to the fuel tank via a drain line. Also, the high pressure delivered by the high pressure pumps, causes some fuel to leak from the fuel injectors. This unused fuel is collected from the injectors and also drained back to the fuel tank. Typically, a 16-cylinder diesel engine has one fuel injector drain for each 8-cylinder block.

An electronic fuel injection controller provides a pulse input to high pressure pump solenoids that drive high pressure pumps and thereby control the injection of fuel into each cylinder. The leading edge of the pulse sets the start of fuel injection, and the pulse length determines the duration of fuel injection into the cylinder. The pulse duration determines the fuel mass that is injected into each cylinder, as measured in $mm^3$/injection. Look-up tables provide the required start of injection timing as a function of engine speed and fuel value, which is a measure of the volume of fuel being injected into each cylinder.

The efficient functioning of diesel locomotive engines, especially as it relates to fuel usage, is an important factor in the operational costs of the railroad. Periodically, diesel locomotive engines are tested for output to determine whether a repair or overhaul is necessary. Various testing methods are used, with one common test employing a dynamo meter for measuring the mechanical output power of the engine. Another method utilized in the prior art simply considers the total miles run or diesel engine operational horsepower-hours. It is recognized, however, that these methods do not allow for precise analysis of the engine condition due to variations between engines, especially engine combustion conditions.

The most efficient method of determining engine condition is to measure the actual amount of fuel consumed by the engine per unit of work. In accord with the dual pump system discussed above, the measurement of fuel consumption requires four flow meters, with one flow meter on each of the three return lines and a fourth flow meter on the supply line. The four flow meter readings must be summed to calculate the amount of fuel used by the diesel engine. This is not accomplished without difficulty, due to inherent inaccuracies in the system and measuring devices and further the expense associated with installing such a system. But, given the high fuel costs, generally the highest cost element associated with operation of a railroad, it is especially important to ensure the locomotives are in excellent operating condition and further that the locomotive operators employ efficient operational techniques to contain the fuel costs.

In addition to budget matters, in day-to-day train operation, it is especially important to monitor the quantity of fuel remaining in the tanks or conversely the quantity of fuel used since the tank was filled to avoid running the fuel tank dry. Freight trains typically include up to six locomotives, coupled together at the front of the train or employed as pusher or helper locomotives distributed among the freight cars. Each locomotive is self-contained and includes its own fuel tank. In most train systems of the prior art, there has been no reliable or convenient technique for measuring the amount of fuel in each tank. Even experienced train operators have been surprised to find their fuel tank suddenly empty midway between fueling terminals. Obviously, such a situation creates considerable expense for the railroad and inconvenience to the freight owner.

Fuel gauges are used on locomotives, but most are not accessible to the train crew while the train is moving. Instead, some locomotives are provided with a sight glass, which can measure the top 1000 gallons of fuel in the tank. Other locomotives are equipped with float gages that can be read by an observer on the ground when the train is stopped. These float gages are known to be inaccurate and cannot be read from walkway along the locomotive cab or from inside the cab. Hence, these gages cannot be used while the train is moving.

There are also several types of electronic fuel gages used on locomotives. One such gage employs a pressure sensor at the bottom of the fuel tank. The sensor produces a voltage proportional to the amount of fuel remaining in the tank and transmits the voltage value to the cab, where it is converted to a display indicative of the approximate quantity of fuel remaining in the tank.

Another exemplary fuel gage employs a bubble-type fuel measuring system. The system operates by measuring the pressure exerted by the fuel in a bubble tube positioned near the bottom of the fuel tank. In one embodiment, the system employs several bubbling tubes located at predetermined locations in the tank and positioned a fixed height from the tank bottom. A predetermined volume of air flow is forced through the tubes. Pressure transducers periodically measure the air pressure supplied to the bubbling tubes respectively. A microprocessor converts the pressure data to determine the average normalized pressure that the fuel exerts at the bottom of the tank and then from that determines the level of fuel remaining in the tank. Since the volume of air bubbled into the tank is constant, the pressure required to bubble a given volume will be greater when the tank is fuller. As fuel is consumed and the fuel level drops, the pressure required to bubble the same volume of air into the tank is reduced. The accuracy of this bubble-type fuel measuring system depends in large measure on the health of the pneumatic components of the system. If, for example, there are any air leaks in the system, the pressure sensed at the bubble tube will be influenced by the atmospheric backpressure thereby rendering the measured fuel readings inaccurate.

While some of the electronic and pneumatic systems currently available enable the to train crew to monitor fuel levels while the train is moving, most do not provide for the monitoring of fuel levels in a locomotive where no crew members are present, for instance in a consist of several locomotives where only the lead locomotive has an operator. If the locomotive operator must determine the fuel available in the locomotive consist, the train must be stopped and the gauge in each locomotive checked individually.

BRIEF SUMMARY OF THE INVENTION

To evaluate the various methods of train operation, for example, the time at which the locomotive is switched from one notch position to another, and the use of stretch braking (the simultaneous application of motive power and brakes, as a technique to control the train at the expense of fuel consumption), it would be advantageous to know the maximum amount of fuel that should be used by a locomotive during a run. To date, measurement complexity has allowed the determination of this value only in a laboratory. According to the present invention, it is possible to determine, with fairly significant accuracy, the amount of fuel that an ideal locomotive is expected to use during a given run, based on an algorithm derived from laboratory analysis and the amount of time the locomotive spends at each engine speed (or notch position) during the run. An ideal locomotive will use a derivable quantity of fuel in each notch position and this quantity can be calculated. It is noted that the ideal fuel quantity is not dependent on the topography encountered during the run or speed limitations, etc., because it is based solely on the notch position (or engine speed) and the horsepower delivered. Although the calculation is derived for a so-called "ideal" locomotive, in practice it has been determined that the ideal values are within a few percentage points of the actual values. The difference between the values is influenced by, for example, the efficiency of the fuel system, fuel injector and pump wear and ambient conditions. In accordance with the teachings of the present invention, the ideal fuel usage can be determined and utilized to evaluate the locomotive operator's ability to operate the train in a fuel efficient manner. Also, if the fuel quantity at the beginning of the run is known, the calculated quantity used can be subtracted from the initial value to derive the amount of fuel left in the tanks.

The present invention provides accurate calculation of ideal fuel usage by an onboard microprocessor, based on inputs that identify specific operational modes of the locomotive. The microprocessor calculates the ideal fuel usage based on the operating time in each mode and the ideal fuel usage factors associated with each mode. Determination of these fuel usage factors must be accomplished through laboratory measurements for locomotives of a given type or class. Tests have indicated that the ideal fuel usage calculated in accordance with the teachings of this invention offers an accuracy that rivals or even exceeds fuel usage measurements (or the fuel quantity remaining in the tanks) as determined by prior art mechanical, pneumatic, or electronic techniques. Since many of today's operational locomotives include a microprocessor, implementation of the present invention requires only the inclusion of the algorithm of the present invention into the microprocessor memory for execution.

Although the system according to the present invention does not provide any indication of the absolute operating efficiency of the locomotive, it does, however, provide a tool to evaluate the performance of a locomotive operator and the methods of train handling employees.

BRIEF DESCRIPTION OF THE DRAWINGS

The present invention can be more easily understood and the further advantages and uses thereof more readily apparent when considered in view of the description of the preferred embodiments and the following figures in which.

DETAILED DESCRIPTION OF THE PREFERRED EMBODIMENTS

Figure 1:
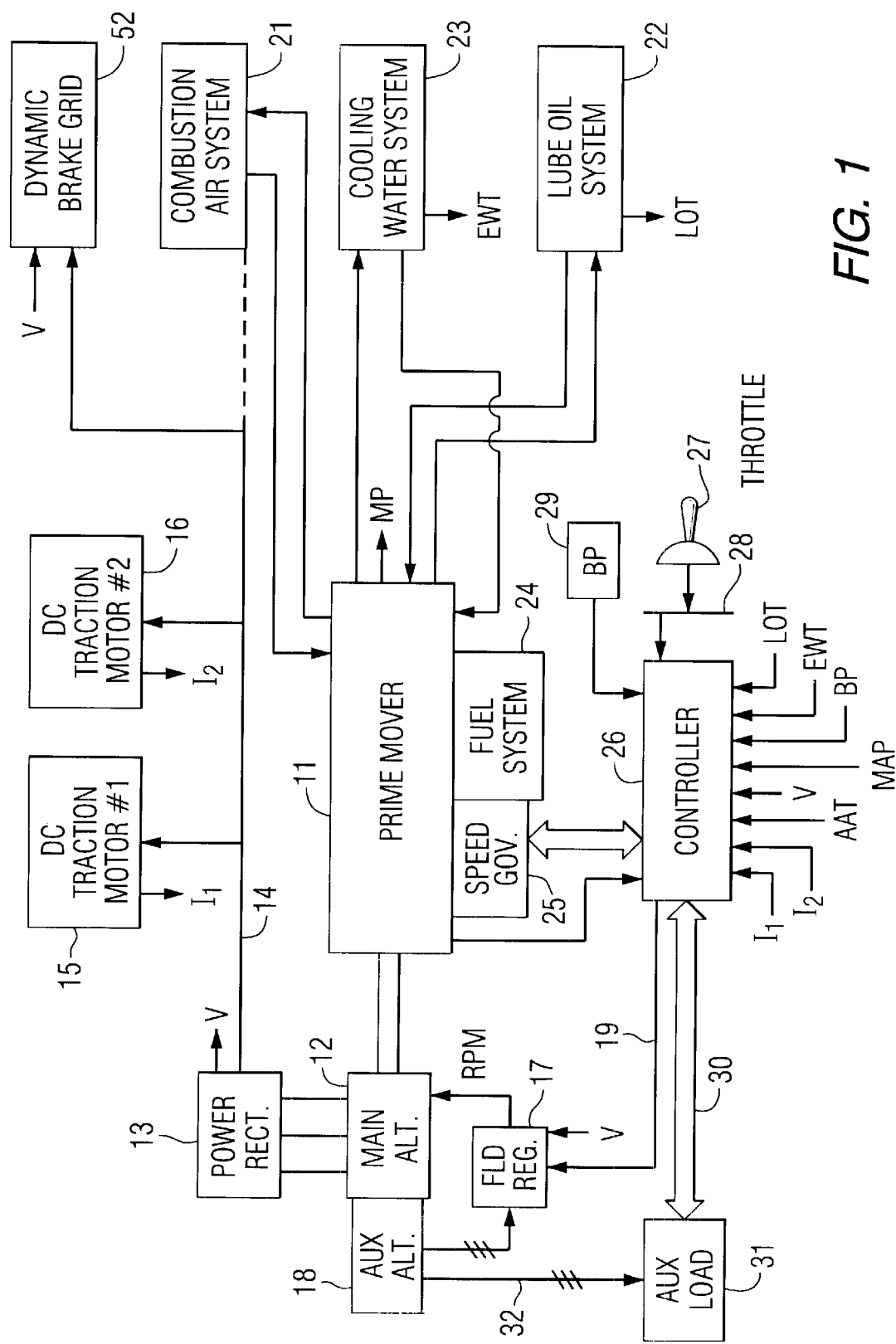
FIG. 1 is a schematic diagram of the principle components of a locomotive system.

Before describing in detail the particular scheme for determining fuel usage in a locomotive in accordance with the teachings of the present invention, it should be observed that the present invention resides primarily in a novel combination of processing steps and hardware elements related to a method and apparatus for determining locomotive fuel usage. Accordingly, these processing steps and hardware components have been represented by conventional processes and elements in the drawings, showing only those specific details that are pertinent to the present invention so as not to obscure the disclosure with structural details that will be readily apparent to those skilled in the art having the benefit of the description herein.

Referring now to FIG. 1, there is shown a simplified functional block diagram of a locomotive propulsion system including a variable speed prime mover 11 mechanically coupled to drive a three-phase alternating current (AC) synchronous alternator 12, also referred to as a main traction alternator. The three-phase voltages generated by the alternator 12 are applied to AC input terminals of at least one three-phase, big-directional uncontrolled power rectifier bridge 13. In the illustrated system, the locomotive utilizes DC traction motors 15 and 16 for driving the wheels of the locomotive. In such a case, the rectified electric power output of the bridge 13 is supplied via a DC bus 14 to the parallel connected armature windings of the traction motors 15, 16. While only two motors, 15 and 16 are shown, in practice, a traction motor is supplied for each axle of a locomotive and there are typically two to three axles per truck with two trucks per locomotive so that a conventional locomotive may have from four to six traction motors. If the traction motors are AC motors rather than DC motors, a controlled inverter (not shown) is interposed on the DC bus 14 to supply variable frequency power to the AC motors.

The prime mover 11 is a thermal or internal combustion engine and is typically a high horsepower, turbo charged, four stroke, 16 cylinder diesel engine. Such an engine has a number of ancillary systems that are represented by the labeled blocks in FIG. 1. A combustion air system 21 conventionally includes an engine exhaust gas driven turbo charger for compressing air in the combustion air intake manifold of the engine. A lube oil system 22 conventionally includes an engine crankshaft driven pump and associated piping for supplying suitable lubricating oil to the various moving parts of the prime mover 11. A cooling water system 23 conventionally includes a pump for circulating relatively cool water from a plurality of air-cooled heat exchangers or radiators to a lube oil cooler and to the cylinder liners of the engine for absorbing heat rejected during the combustion process, and also to inter coolers through which the combustion air passes after being compressed by the turbocharger.

Still further, the diesel engine includes a fuel system 24 comprising a fuel tank, fuel pumps and nozzles for injecting fuel oil into the respective power cylinders which are arranged in two rows or banks on opposite sides of the prime mover 11. Tappet rods cooperate with fuel cams on a pair of camshafts for actuating the respective fuel injectors at the proper times during each full turn of the engine camshaft. The electronic fuel injector controller of the fuel system 24 controls the initiation and duration of fuel flow into a cylinder each time the associated injector is actuated. The excitation of each fuel pump solenoid, and hence the quantity of fuel that is being supplied to the engine, is controlled by output signals from the engine speed governor 25. The speed governor 25 regulates engine speed by automatically controlling fuel flow within predetermined fuel value limits in a direction and by an amount that minimizes any difference between actual and desired speeds of the engine crankshaft. The desired speed is set by a variable speed control signal received from a controller 26, which signal is herein called a speed command signal or speed call signal.

In a normal motoring or propulsion mode of operation, the value of the engine speed call signal provided by the controller 26 is determined by the position of a handle 27 of a manually operated throttle to which the controller is coupled. Each notch position of the throttle 27 commands a specific engine speed (and a locomotive horsepower request). A locomotive throttle conventionally has eight power positions or notches (N), plus an idle position. N1 corresponds to the minimum desired engine speed or power, while N8 corresponds to maximum speed and full power. In a consist of two or more locomotives, only the lead unit is usually attended and the controller on board each trailing unit receives, over a train line 28, a signal that indicates the throttle position selected by the operator in the lead unit.

For each power level of the engine there is a corresponding desired load. The controller 26 is arranged to translate the throttle notch information into a control signal of appropriate magnitude on the input line 19 of the alternator field regulator 17, whereby the traction power is regulated to match the called-for power, so long as the alternator output voltage and load current are both within predetermined limits. For this purpose, it is necessary to supply the controller 26 with information about various operating conditions and parameters of the propulsion system, including the engine and its support systems. More particularly, the controller 26 typically receives voltage and current feedback signals representative of the power supplied to the traction motors and a load control signal issued by the governor system 25 if the engine cannot develop the power demanded and still maintain the called-for speed. The controller also receives an engine speed signal (in RPM) indicating the rotational speed of the engine crankshaft and ambient air pressure signal (BP) from a barometric pressure sensor 29, an intake manifold air pressure signal (MAP) from a pressure sensor associated with an air intake manifold at the engine, an oil temperature signal (LOT) from a temperature sensor on the hot oil side of the lube oil cooler, a water temperature signal (EWT) from a temperature sensor in a hot water section of the cooling water system 23 and an ambient air temperature signal (AAT) from an appropriate temperature sensor. The controller uses the signal EWT to control radiator fan motors that control the flow of air across the heat exchange tubes of the radiators to maintain a relatively constant engine operating temperature over the load range of the engine and with wide variations in ambient temperature.

The above listing is representative of the signals that are applied to the controller 26 to enable the controller to properly send the speed command to the governor 25 and to regulate the power output of the engine to meet the requirements of the locomotive and any auxiliary equipment coupled to the locomotive. While each cylinder of the engine has its own individually controllable fuel injector, typical operation of the engine is to supply the same control signal from the engine speed governor 25 to each fuel injector such that the amount of fuel injected into each cylinder of the engine is the same.

Locomotives also typically include a dynamic brake system that operates to slow the train as determined by a dynamic brake handle having various positions with defined engine operating speeds for each. In the dynamic braking mode, the locomotive traction motors act as generators, driven by the rotating wheels, to retard the train speed. The dynamic braking system provides a current to the traction motors, as determined by the dynamic brake handle position, that creates a magnetic field in the motor stator winding. The rotating wheels drive the rotor windings and a current is induced therein as the winding rotates through the magnetic field of the stator. This magnetic field tends to oppose further rotation of the rotor, thus slowing the wheels. The current produced is dissipated in a bank of resistors located within the locomotive.

Locomotives, unlike automobiles or trucks, do not operate over an infinite range of engine speeds and horsepower values. Instead, as discussed above, locomotives operate at a limited number of operating points called notches. Each notch defines a specific engine speed and horsepower as delivered to the traction motors. Because there are a limited number of deterministic operating points for the locomotive, it is practical to determine the ideal fuel usage during operation at each of the operating points. The ideal fuel usage is obtained through laboratory testing and data collection and can then be used to create an algorithm for calculating the ideal fuel usage during train operation. In a sense the ideal fuel usage calculated value can be used to grade the locomotive operator's performance during train operation. For example, operation in notch number 4 sets the engine speed at 888 revolutions per minute and the traction motors provide 1400 horsepower. Whether the locomotive is traveling uphill or downhill, in hot weather or cold weather (which is known to have an effect on engine performance), the controller 26 of FIG. 1 controls the various locomotive subsystems to ensure the diesel engine continues to turn at 888 revolutions per minute and the traction motors deliver 1400 horsepower. The ideal quantity of fuel consumed at notch 4 can then be calculated as set forth below.

The diesel engine has the ability to produce full horsepower output under a considerable range of operating conditions. Notwithstanding changes in the ambient temperature and pressure the operational altitude, and the fuel quality or heating value variability, the engine is designed to produce full horsepower output as determined by the selected notch position. In fact, the engine can produce full horsepower with up to one non-functional cylinder. So long as the diesel engine is able to produce the commanded horsepower or full horsepower value, even if more fuel is consumed, the time interval an operator spends in a given notch or dynamic break step will be the same. Therefore, even though operational conditions will vary and therefore cause the diesel engine to consume more or less fuel, the calculated fuel usage in accordance with the teachings of the present invention will be the same.

Given these operational attributes, through laboratory analysis, the optimum quantity of fuel to be used at notch 4 (and all the other notch positions) can be determined. A single equation (as will be discussed further herein below) and two parameter variables within that equation (both of which are functions of the engine speed) allows calculation of the ideal fuel usage. When the results of the equation are compared with actual fuel usage on a locomotive in service the variance has been shown to be only a few percent. In one test run, the variance was 0.5%, after correction for barometric pressure, ambient temperature, and fuel heating value. Without the fuel heating value correction, the variance may increase about an additional 1%.

Figure 2:
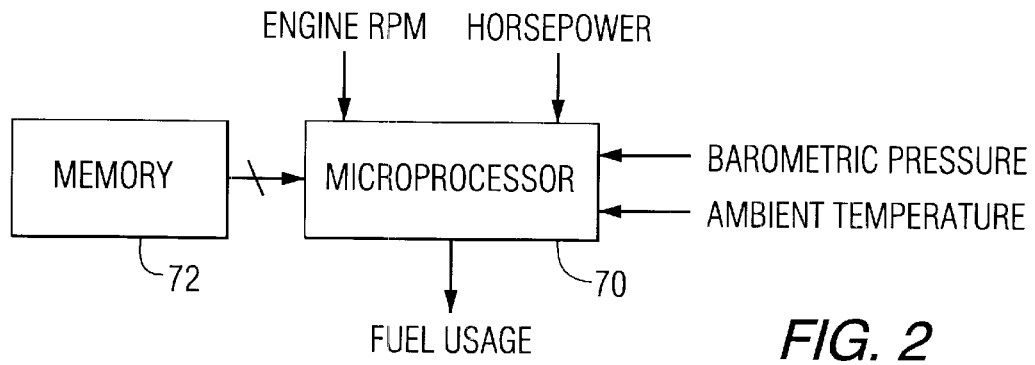
FIG. 2 is a block diagram showing the microprocessor system for executing the algorithm of FIG. 3.

With reference to FIG. 2, a microprocessor 70 receives inputs from the controller 26 indicative of the engine speed (in rpm) and the horsepower delivered to the traction motors. Using fuel usage factors and a fuel usage algorithm (to be discussed further below) stored in a memory 72, the microprocessor 70 computes the ideal fuel usage based on the time spent in each operating mode. The time spent in each operating mode is derivable from changes in the engine speed or horsepower values input to the microprocessor 70. In lieu of the engine speed and horsepower input values, the input signals to the microprocessor 70 can be representative of the throttle notch position and the dynamic brake position. Since each throttle and dynamic brake position commands a given engine speed and horsepower value, the engine speed and horsepower values can be derived from the position values. The time spent in each position can also be derived from the position changes, based on a predetermined initial reference.

The fuel usage factors used in the algorithm are derived from laboratory tests conducted when the locomotive is out of service. Generally, these tests are conducted on one or more locomotives in each locomotive class, or in any case locomotives with the same operational characteristics. The fuel usage factors are applied to the calculation for all locomotives within that class or with the same performance characteristics.

The fuel usage value calculated in accordance with the present invention can be provided to the locomotive operator, for example, by displaying the fuel usage in gallons on a locomotive cab display. At the beginning of a locomotive run, the locomotive operator can zero the fuel usage display. During the run, the ideal number of gallons that should be used is accumulated in accordance with the teachings of the present invention and displayed to the locomotive operator. The fuel usage value can also be transmitted to a dispatcher or central operations center for evaluation and recording. In particular, the railroad can compare the ideal fuel usage value with the ideal fuel usage value of other operators to grade the locomotive operator's performance.

As is known by those skilled in the art, the microprocessor 70 can be implemented by a separate and distinct microprocessor within the locomotive or, alternatively, the process of calculating the ideal fuel usage value can be performed by another microprocessor in the locomotive. Also, the fuel usage value does not need to be calculated in real time simultaneously with each notch change. So long as notch position and change information is stored in the memory 72 the actual calculation of the fuel usage value can be delayed until a convenient time or until the end of the locomotive run.

In accordance with the teachings of the present invention, the equation used to calculate the ideal fuel usage per unit of time is set forth below.

$$\text{fuel usage/unit time} = [(\text{horsepower} * A) + B] \quad (1)$$

The factors A and B are empirically determined constants based on engine speed and a specific engine configuration. The values are determined by measuring fuel usage at the engine speed of each notch position. A new value of fuel usage/unit time is calculated for each engine speed by using equation (1) and values for A and B as appropriate for that engine speed. The units for A are lbs/hp-hr and for B are lbs/hr.

The total ideal fuel usage for a train run is the sum of the fuel usage at each engine speed over the duration of the run. This value is calculated by first calculating the total fuel usage at each engine speed as set forth in equation (2), then summing the individual values as in (3).

$$\text{total fuel usage at each engine speed} = (\text{total fuel usage/unit time}) * (\text{time at each engine speed}) \quad (2)$$

$$\text{total fuel usage} = \Sigma \text{ total fuel usage at each engine speed} \quad (3)$$

It is also possible to correct the equation (1) above for the ambient barometric pressure and ambient air temperature. In particular, with reference to FIG. 2, two additional inputs to the microprocessor 70 are the barometric pressure and the ambient air temperature. Existing locomotives generally include sensors for measuring both of the values. With reference to FIG. 1, note that the barometric pressure and the ambient air temperature values are input to the controller 26. The equation below includes correction factors for the barometric pressure (BPCF) and the ambient temperature (ATCF). The correction factors BPCF and ATCF are also empirically derived but are not essential to the equation for calculating ideal fuel usage. Instead, these parameters represent correction factors that will improve the accuracy of the derived result. Use of these factors will, however, allow a more accurate calculation of the amount of fuel used by the locomotive, and consequently, the amount of fuel remaining in the fuel tank.

$$\text{fuel usage/unit time} = [(\text{horsepower} * A) + B] * BPCF * ATCF \quad (4)$$

Figure 3:
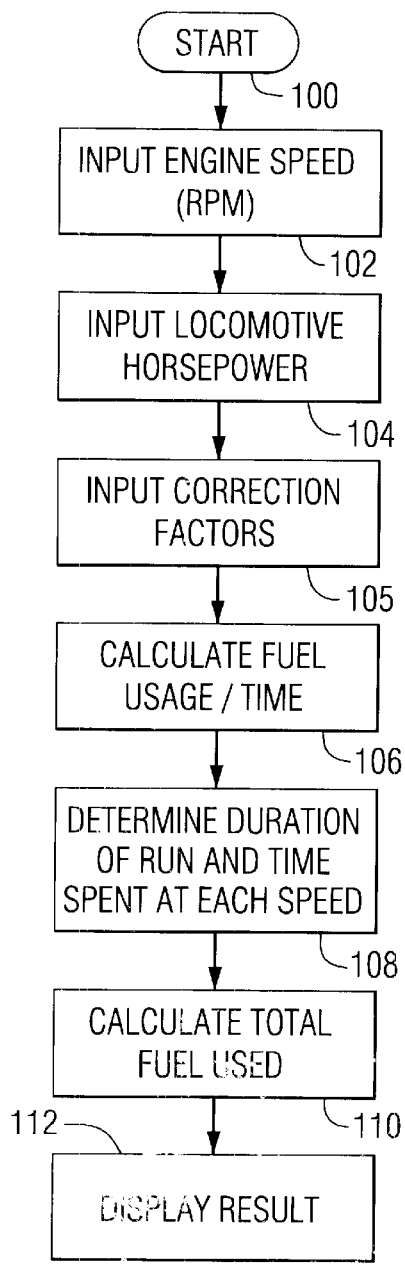
FIG. 3 is a flow chart illustrating the algorithmic processing steps in accordance with the fuel usage indicator of the present invention.

With reference to FIG. 3, there is shown a flow chart in accordance with the teachings of the present invention. Processing begins at a start step 100. As previously mentioned, the calculation of ideal fuel usage can be performed at any time, so long as the notch position changes and the duration of each notch are known. At a step 102, the engine speed value is obtained. At a step 104, the locomotive horsepower value is obtained. In the event correction factors, such as the barometric pressure and ambient temperature, are to be utilized in the calculation (see equation (3) above), these correction values are obtained from a table where the index into the table is the actual air temperature or actual barometric pressure. It is also possible to provide a fuel heating value (the amount of energy derivable from a given quantity of fuel) correction factor. Fuel heating values are generally determined through laboratory analysis. Any desired correction factors are obtained at a step 105. At a step 106, the fuel used per unit time is calculated in accord with the equation (1) above. At a step 108, the duration of the locomotive run and the time at each notch position or speed is determined. Finally, at a step 110, the total quantity of fuel used is calculated in accord with equations (2) and (3) above. The calculated value is displayed or transmitted to a central operations center at a step 112.

While the invention has been described with reference to a preferred embodiment, it will be understood by those skilled in the art that various changes may be made and equivalent elements may be substituted for elements of the invention without departing from the scope thereof. In addition, modifications may be made to the teachings of the present invention to adapt the invention to a particular situation, without departing from the essential scope thereof. Therefore, it is intended that the invention not be limited to the particular embodiment disclosed as the best mode contemplated for carrying out this invention, but that the invention will include all embodiments falling within the scope of the appended claims. Its usage may also be applicable to vehicles other than locomotives, which may have a control system that allows an infinite range of operating points rather than the eight discrete operating throttle notches found on locomotives. In this case, it is still possible to provide an algorithm that allows calculation of the engine fuel usage and rate at any given instant of time.

What is claimed is:

1. A method for determining actual fuel usage by a locomotive during an operational interval, wherein the locomotive includes a diesel engine and traction motors for driving the locomotive, and wherein the locomotive is operated in one of a plurality of user-selected operating modes, wherein each operating mode is associated with a predetermined engine speed and traction motor horsepower, said method comprising:

(a) determining the time spent in each operating mode;

(b) determining the horsepower delivered in each operating mode;

(c) determining the engine speed in each operating mode; and (d) relating the values determined in steps (a), (b), and (c) to calculate the fuel usage.

2. The method of claim 1 further including the step of determining a first and a second parameter based on the determined engine speed, wherein the first parameter is designated A and the second parameter is designated B, and wherein the fuel usage per unit time for a given operating mode is calculated from:

$$\text{fuel usage/unit time} = [(\text{horsepower} * A) + B].$$

3. The method of claim 2 further including multiplying the fuel usage per unit time value calculated for each operating mode by the amount of time spent in the operating mode to determine a mode fuel usage value.

4. The method of claim 3 further including summing the mode fuel usage values for the given interval, to determine the fuel usage.

5. The method of claim 1 further comprising:

(e) correcting the fuel usage determined at the step (d) based on ambient conditions.

6. The method of claim 1 further comprising:

(e) correcting the fuel usage value calculated at the step (d) based on ambient temperature.

7. The method of claim 1 further comprising:

(e) correcting the fuel usage value calculated at the step (d) based on ambient pressure.

8. The method of claim 1 further comprising:

(e) correcting the fuel usage value calculated at the step (d) based on the fuel heating value.

9. The method of claim 1 wherein the calculated fuel usage represents the fuel usage for a first locomotive operator, further comprising:

(e) determining the time spent in each operating mode by a second locomotive operators;

(f) relating the values determined in steps (b), (c) and (e) to calculate the fuel usage for the second locomotive operator; and (g) comparing the fuel usage value for the first locomotive operator with the fuel usage value for the second locomotive operator.

10. An apparatus for determining actual fuel usage by a locomotive during an operational interval, wherein the locomotive includes a diesel engine and traction motors for driving the locomotive, and wherein the locomotive is operated in one of a plurality of user-selected operating modes, wherein each operating mode is associated with a predetermined engine speed and traction motor horsepower, said apparatus comprising:

a first module for determining the time spent in each operating mode;

a second module for determining the horsepower delivered in each operating mode;

a third module for determining the engine speed in each operating mode; and a fourth module for relating the values determined by said first, second and third modules to calculate the fuel usage.

11. The apparatus of claim 10 wherein the fourth module uses the following equation for calculating the fuel usage, $$\text{Fuel usage/unit time} = [(\text{horsepower} * A) + B],$$ where the perimeters A and B are determined based on engine speed.

12. A method for determining actual fuel usage by a vehicle during an operational interval, wherein the vehicle includes an engine for driving the vehicle, and wherein the interval is subdivided into a plurality of discrete time subintervals, said method comprising:

(a) determining the time the vehicle operates in each subinterval;

(b) determining the horsepower delivered during each subinterval;

(c) determining the engine speed during each subinterval; and (d) relating the values determined at steps (a), (b) and(c) to calculate the fuel usage during the interval.

* * * * *